Sept. 22, 1959   J. F. WHITENECK   2,905,925
WARNING LIGHT FOR ATTACHING TO AN AUTOMOBILE
Filed Jan. 20, 1958
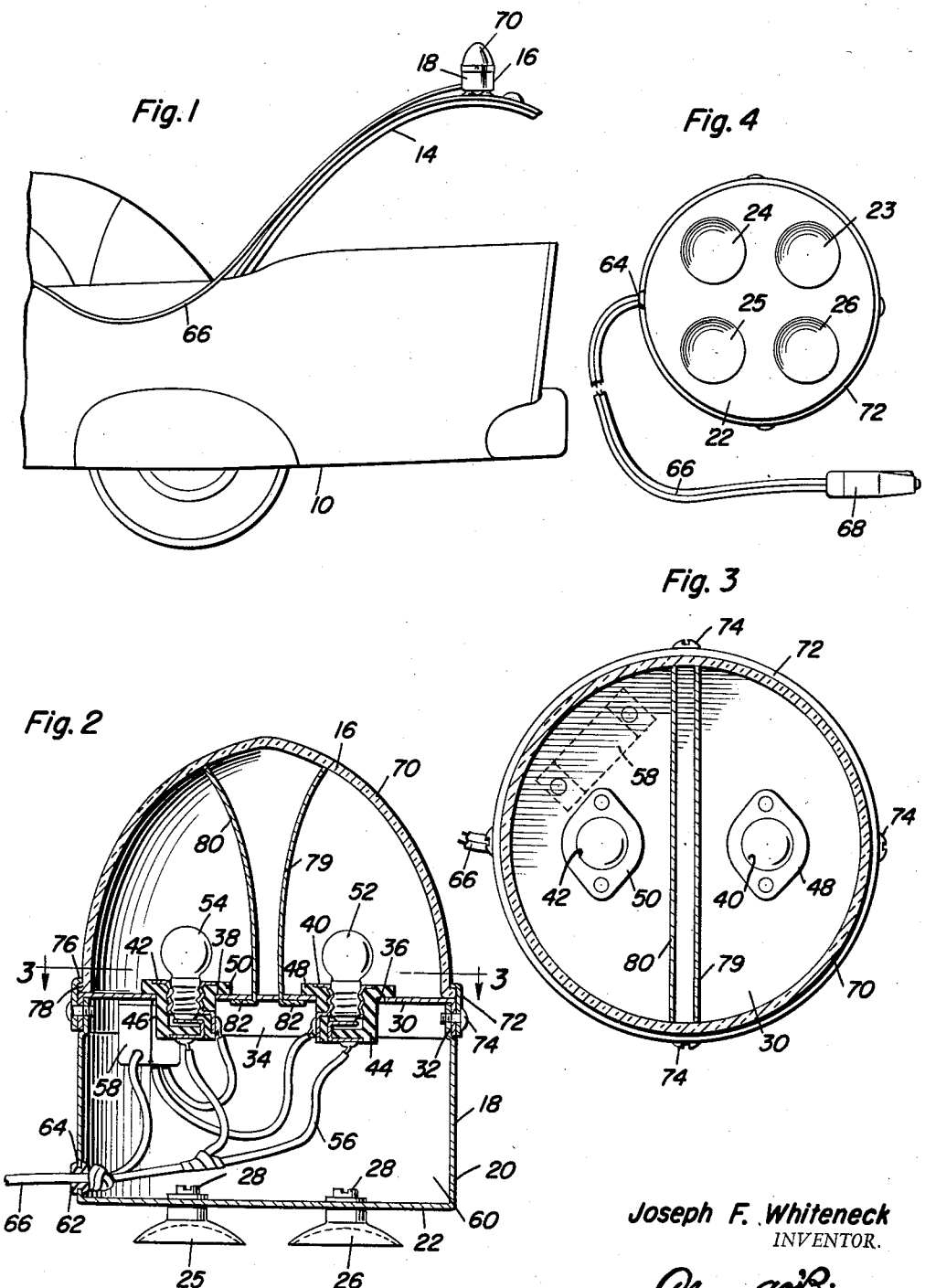
Joseph F. Whiteneck
INVENTOR.

United States Patent Office 2,905,925
Patented Sept. 22, 1959

2,905,925

WARNING LIGHT FOR ATTACHING TO AN AUTOMOBILE

Joseph F. Whiteneck, Hoboken, N.J.

Application January 20, 1958, Serial No. 709,821

2 Claims. (Cl. 340—82)

This invention relates to safety devices and more particularly to a safety light which is adapted to be mounted on a motor vehicle.

An object of the invention is to provide an improved and novel safety light which is adapted to fasten to a motor vehicle and more particularly, adapted to fasten to a motor vehicle to function as a trouble light, warning or signal.

The invention is embodied in a lamp that has a plurality of heavy-duty suction cups on it so that it can fasten to the deck lid, hood or some other part of the motor vehicle and remain fastened in place. The lamp has a lamp housing that accommodates a flasher in circuit with a pair of light bulbs that are beneath a light transmissive dome. Light reflectors are behind a light bulb so that the illumination from the light bulbs is directed in a manner which will do the most good that is, the manner in which will provide maximum lighting in the desired direction.

The lamp can be powered from the energy in the electrical system of the motor vehicle and a very convenient way of obtaining power is to have a plug attachment that fits into the cigar lighter socket of the motor vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary perspective view of a motor vehicle showing one suggested location for the attachment of a lamp of the invention.

Figure 2 is a sectional view of the lamp of Figure 1.

Figure 3 is a transverse sectional view taken on the line 3—3 of Figure 2.

Figure 4 is a bottom view of the lamp in Figure 2.

In the accompanying drawings there is a motor vehicle 10 which has a deck lid 12 in an open position. It is to be clearly understood that the lamp 16 can be placed on the deck lid or on the engine compartment lid or any other place where it is found desirable or useful. However, this invention embodies the principle of applying the lamp onto the deck or engine compartment lids so that when the lids are open, the lamp is positioned considerably above the roof of the motor vehicle. This provides for a full 360° vision about the lamp. It can be seen from all directions when so located.

Lamp 16 is made of a lamp housing 18 that has a side wall 20 and a bottom 22. A plurality of suction cups, preferably four section cups 23, 24, 25 and 26 are each bolted as at 28 or otherwise attached to the bottom 22 of the lamp housing 18. The upper part of the lamp housing has a wall 30 with a depending flange 32 nested with flange 34 that is formed at the upper extremity of the side wall 32. The wall 30 has openings 36 and 38 within which light bulb sockets 40 and 42 are supported. Insulating sleeves 44 and 46 having upper flanges 48 and 50, are set in the openings 36 and 38 and fastened in place. The flanges 48 and 50 seat on the top surface of wall 30 making it possible to simply drop the sleeves 44 and 46 in place when assembling the lamp. Light bulbs 52 and 54 are attached in their sockets 40 and 42. Wiring 56 extends from the two sockets and to the flasher 58 that is supported by the wall 30 in the compartment 60 enclosed by the lamp housing. Grommet 62 is in an opening 64 in side wall 20 and has the main cable 66 passed through it. Plug 68 is on the outer extremity of the cable 66 and is adapted to be fitted in the cigar lighter socket of the motor vehicle. This obtains power for energizing lamps 52 and 54 through flasher 58.

A light transmissive dome 70 which may be of any color or simply made transparent, is attached to the side wall 20 of the lamp housing. The means for holding the dome 70 releasably fastened in place consists in a rim 72 that is held in place by screws 74 and it has an inwardly directed upper flange 76 overlying bead 78 of the dome 70. Two light reflectors 79 and 80 are disposed in the dome 70. Their outer edge is shaped to conform to the shape of dome 70 and they are fastened in place by ears 82 to the wall 30. The surfaces of the reflectors which confront the light bulbs 52 and 54 are concave to direct the light rays in a fore and aft direction respectively from the interior of the dome 70.

In use the lamp can be installed any place on the motor vehicle, although the suggested insulation has been described previously. By plugging in the plug 68 in the cigar lighter socket, the lamp group including lamps 52 and 54 are energized through flasher 58. This yields a clearly visible signal light.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A signal lamp adapted to be mounted on the exterior of a motor vehicle, said signal lamp comprising a lamp housing having a side wall and a bottom attached to the lower edge of said side wall, an upper wall, means fastening said upper wall to the upper edge of said side wall, said upper wall having a depending flange, the upper edge portion of said side wall having an inset flange portion with which the upper wall flange engages so that said flanges overlie each other, a rim extending around said flanges and in contact with said flange of said upper wall, fasteners attached to said rim and to both of said flanges simultaneously holding said upper wall fastened to said housing side wall and said rim to said flanges, a light transmissive cover having a marginal bead, a rim flange at the upper edge of said rim and overlying said light transmissive cover bead thereby holding said light transmissive cover assembled on said housing, said upper wall having an aperture, an insulating sleeve in said aperture, a lamp socket carried by said insulating sleeve, a portion of said socket and sleeve depending beneath said upper wall, said socket opening above said upper wall to accommodate a lamp above said upper wall.

2. A signal lamp adapted to be mounted on the exterior of a motor vehicle, said signal lamp comprising a lamp housing having a side wall and a bottom attached to the lower edge of said side wall, an upper wall, means fastening said upper wall to the upper edge of said side wall, said upper wall having a depending flange, the upper edge portion of said side wall having an inset flange portion with which the upper wall flange engages so that said flanges overlie each other, a rim extending around said flanges and in contact with said flange of said upper wall, fasteners attached to said rim and to both of said flanges simultaneously holding said upper wall fastened to said housing side wall and said rim to said flanges, a light transmissive cover having a marginal bead, a rim flange at the upper edge of said rim and overlying said light transmissive cover bead thereby holding said light transmissive cover assembled on said housing, said upper wall having an aperture, an insulating sleeve in said aperture, a lamp socket carried by said insulating sleeve, a portion of said socket and sleeve depending beneath said upper wall, said socket opening above said upper wall to accommodate a lamp above said upper wall, a second insulating sleeve, said upper wall having a second aperture accommodating said second insulating sleeve, a second socket in said second insulating sleeve and having a portion depending below said upper wall and opening of said upper wall to accommodate a lamp above said upper wall, said light transmissive cover being a dome, and at least one reflector located between said first and second sockets and within the confines of said dome thereby subdividing the dome into discrete light compartments each containing a single socket.

References Cited in the file of this patent
UNITED STATES PATENTS

| | | |
|---|---|---|
| 1,389,180 | Bennett | Aug. 30, 1921 |
| 1,840,763 | Benchley | Jan. 12, 1932 |
| 1,972,090 | Getty | Sept. 4, 1934 |
| 2,078,894 | Haines | Apr. 27, 1937 |
| 2,139,420 | Richards | Dec. 6, 1938 |
| 2,578,239 | Gosswiller | Dec. 11, 1951 |
| 2,675,545 | Wolper | Apr. 13, 1954 |
| 2,704,839 | Sweet | Mar. 22, 1955 |
| 2,812,423 | Penna | Nov. 5, 1957 |